Patented May 23, 1939

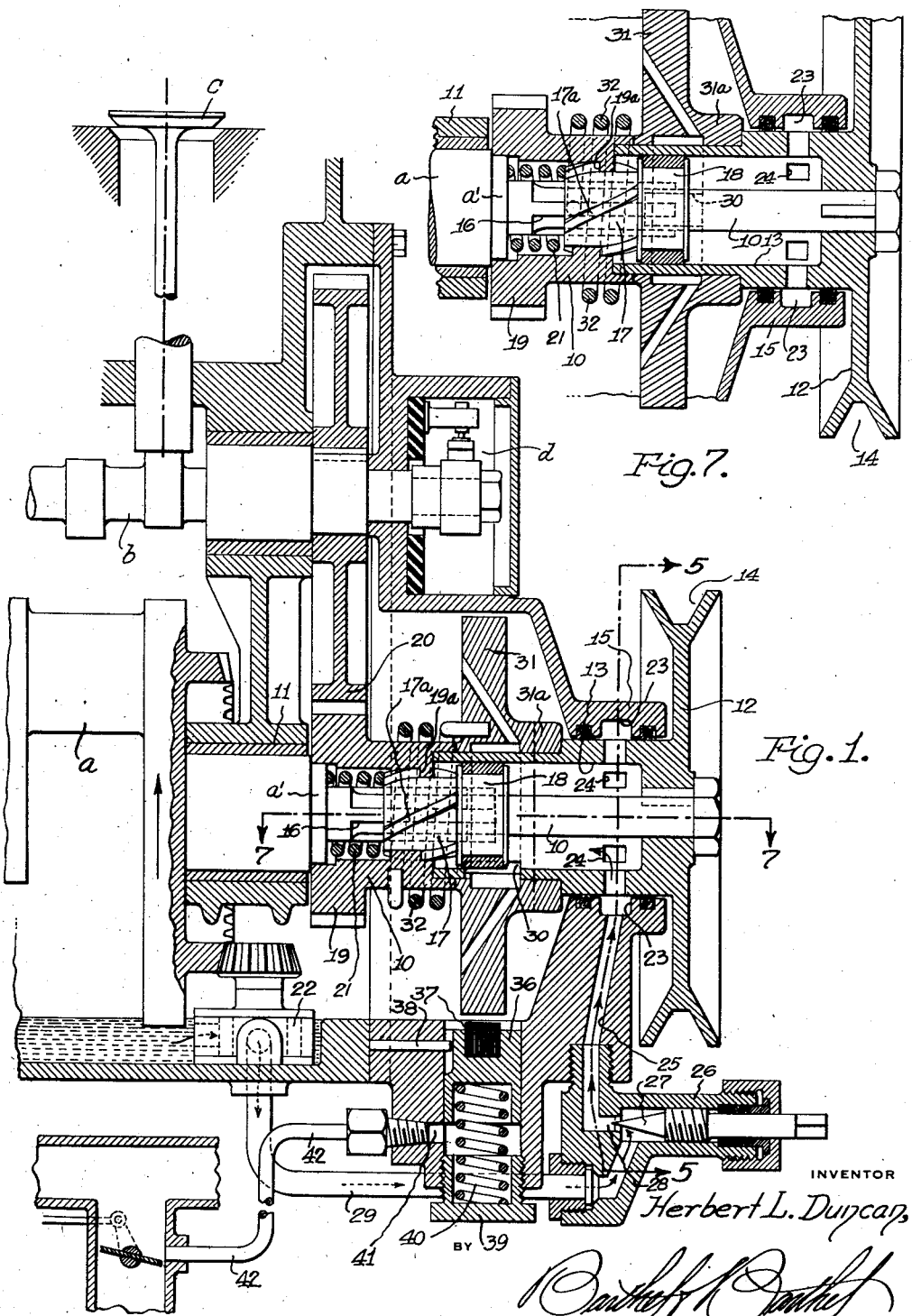

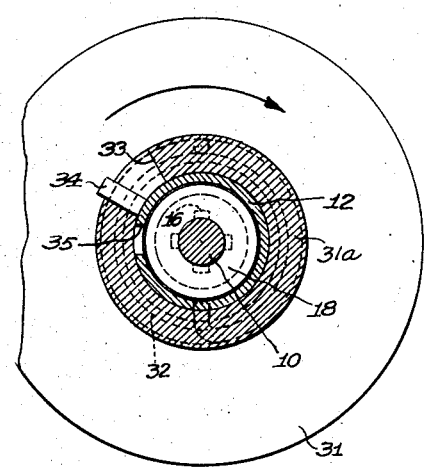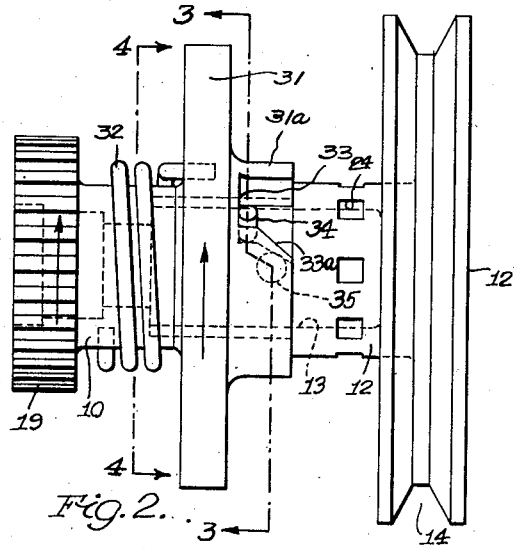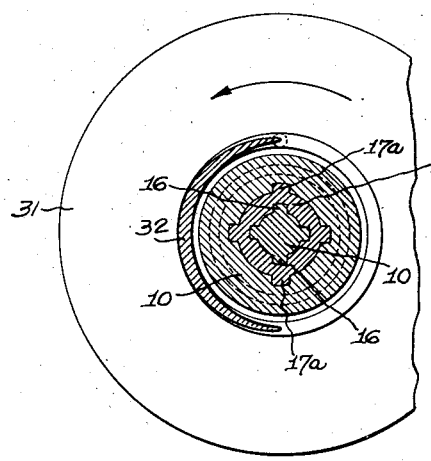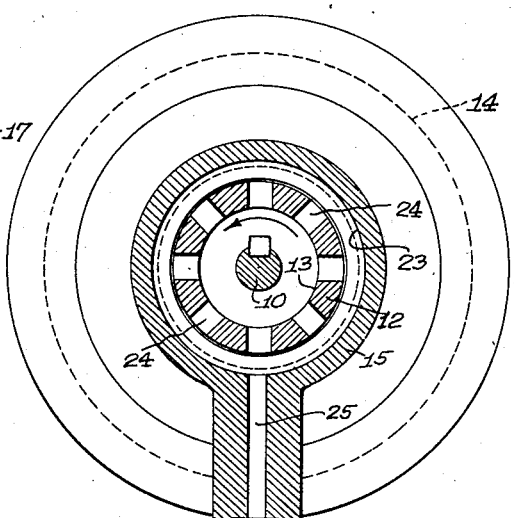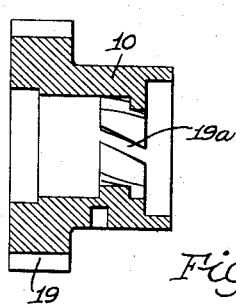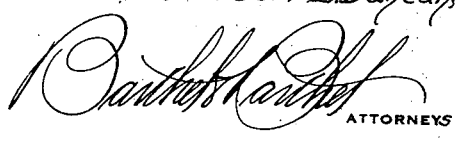

2,159,017

UNITED STATES PATENT OFFICE 2,159,017

CONTROL MECHANISM FOR INTERNAL COMBUSTION ENGINES

Herbert L. Duncan, Highland Park, Mich., assignor of one-half to Lewis P. Threlkeld, Detroit, Mich.

Application August 17, 1937, Serial No. 159,555

24 Claims. (Cl. 123—90)

This invention relates to improvements in the control of internal combustion engine operations, and pertains more particularly to control of the timing activities of such operations, and more particularly to the timing of the admission of charges and the firing of such charges.

Certain fundamental conditions are present and are well-known in connection with engine operation. At low speeds, such as idling, the charge of gas is limited with the result that the compression value of the charge is low; with movement of the throttle or accelerator pedal to increase the volume of gas admitted per unit of time, the volume admitted increases, with consequent increase in compression until in open position of the throttle the compression value reaches its maximum. But it is found that the difference in compression values also brings with it the condition that with the value low the charge burns more slowly than when the compression value is high; as a result, the explosive pressure is more or less variable as to time, if no control is present, lending to the possibility that it may take place when the piston has passed too far beyond the dead center position, resulting in loss of power, overheating of the engine as well as excessive fuel consumption, etc., including knocking, depending upon the particular conditions present.

The difficulty is generally met by varying the timing of the admission of the gas or of the ignition of the charge, or both, by advancing either or both under certain conditions and by retarding under other conditions. With the slower burning action under low compression, the spark is advanced, so as to begin the burning earlier; under high compression conditions the spark is retarded to prevent completion of the combustion before a desired point in order to prevent "knocking".

I have found that superior results can be obtained with a greatly simplified structure by changing the characteristics of the speed-responsive agency, substituting for the centrifugal-governor type a hydraulic system which includes a pumping unit itself responsive to the speed of the engine, the medium used, for instance, being the oil content of the engine crank-case. By producing the characteristics of a flowing stream from and to the crank case, and utilizing this in controlling the movements of the translating structures, it is not only possible to secure superior results in accurate timing but to obtain this with a structure of much simpler type.

The present invention therefore has for its objects the production of a time control system of this general type in which the positions of the timing controls are responsive to the speed and load factors of service conditions, with the control mechanism of sufficient flexibility in action as to provide for detecting and meeting the varying conditions which arise in service, and with the control mechanism of simplified type and which provides for superior results with less likelihood of abnormal conditions such as are present because of the super-sensitiveness of centrifugal governor structures in a service where changes occur with suddenness rather than gradual, such as are present in connection with the internal combustion engine operation.

To these and other ends, therefore, the nature of which will be more particularly disclosed hereinafter, the invention consists in the improved methods and constructions and combinations of parts as more particularly described in the following specification, illustrated in the accompanying drawings, and more particularly pointed out in the appended claims.

In the accompanying drawings, in which similar reference characters indicate corresponding parts in each of the views, Figure 1 illustrates, in section, one form of the control mechanism as applied to the crank-shaft of an internal combustion engine, the view illustrating, in section and elevation, sufficient of the parts of the engine as are essential in disclosing the invention;

Fig. 2 is an assembly view, in elevation, showing the hydraulic cylinder, the pinion gear and brake disk;

Fig. 3 is a section taken on line 3—3 of Fig. 2;

Fig. 4 is a section taken on line 4—4 of Fig. 2;

Fig. 5 is a sectional view taken on line 5—5 of Fig. 1;

Fig. 6 is a detail sectional view of the threaded pinion gear;

Fig. 7 is a sectional view taken on line 7—7 of Fig. 1;

Figure 8:
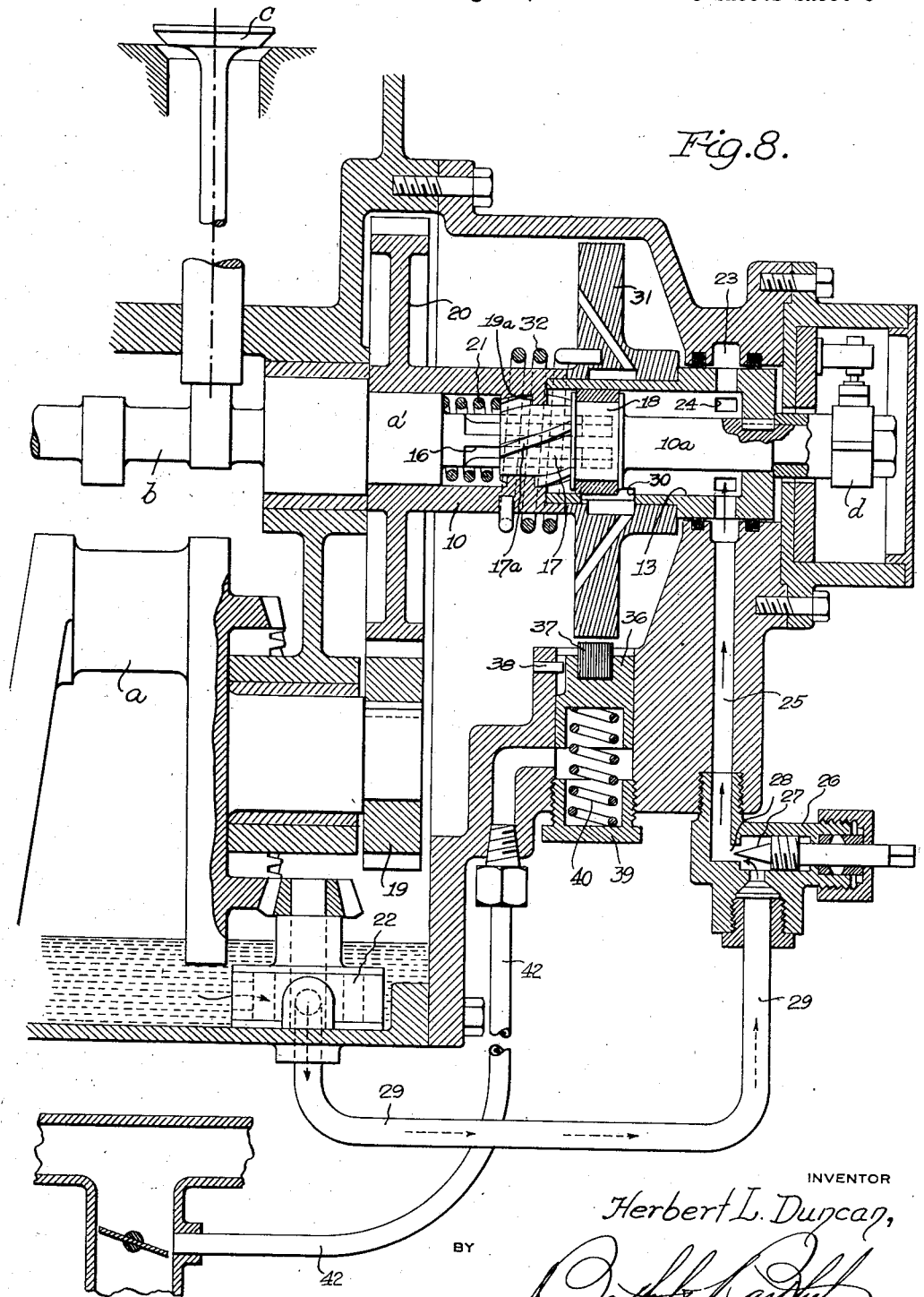
Fig. 8 is a sectional view of the type of Fig. 1, but showing the control mechanism as mounted on the cam shaft instead of on the crank shaft as shown in Fig. 1.

The drawings illustrate only so much of an internal combustion engine as is essential to disclose the invention, *a* indicating the crank shaft, *b* the cam shaft, *c* indicating one of the valves operated by the cam shaft. The timing structure, indicated at *d* is of general type, with the rotating member movable with the cam shaft, the latter being driven by the crank-shaft through the control mechanism, the latter serving to control the operating relationship between the two shafts by varying the angular position of the cam-shaft rotatively to provide the advancing, retarding, etc., activities which serve to meet the service requirements. In this respect the present invention is similar to that of the companion application above identified.

Referring more particularly to Figs. 1 to 7, the crank shaft a carries an extension 10 extending beyond the bearing 11 of the casing within which the control mechanism is mounted. The outer end of the extension carries a member 12, splined to the extension to rotate therewith, said member being designed more particularly to constitute a cylinder 13, presently described in detail; the member 12 may also, as indicated in Fig. 1, carry a fan pulley 14, if desired, the latter, however, forming no part of the present invention. The member 12 has a bearing relation to the casing, with the bearing—indicated at 15—designed to set up a sealed relation with respect to the external face of the member while permitting the latter to rotate with the crank-shaft.

The inner end of the extension 10 is connected with a reduced or stepped end a' of the crank-shaft, and a lengthy zone of such inner end is splined, as at 16, to support an externally-splined portion 17 of a piston 18, the portion and piston being suitably connected as to move in unison rotatively and also axially of the extension 10, with the piston 18 traversing the wall of cylinder 13 during such axial movements. Since member 12 and portion 17 are both splined to the extension 10, the member 12, portion 17, and piston 18 will rotate in unison with extension 10, and hence at crank-shaft speed, since the extension is carried directly by the crank-shaft a. Hence, the only relative movements between these parts is the axial movement of the piston 18 and its portion 17—a movement in which the position of the piston 18 within cylinder 13 is varied. Member 17 carries one or more external splines 17a, these extending angularly to the axis of the member and serving to constitute a pseudo-thread characteristic of very slow advance.

19 indicates an annular pinion gear supported at one end by the step a' of the crank-shaft and its other end externally of the inner end of cylinder 13, thus permitting relative rotative movement of the pinion gear relative to the crank-shaft. Said gear 19 is provided with an internally-threaded zone 19a, complemental to the splines 17a of portion 17, said threaded relationship serving to provide a drive relationship between the crank-shaft and gear, made manifest through extension 10 and portion 17, thus causing the gear to rotate constantly during crank-shaft rotation. However, due to the fact that the connection between portion 17 and gear 19 is a pseudo-threaded one in which portion 17 is capable of axial movement, thus bringing different zones of the external splines into activity with the gear threads, the gear 19 can be moved rotatively in either direction additionally to and without affecting the drive relation to the crank-shaft, the additional rotative movements serving to shift the angular portion of any given point of the gear a distance determined by the length of the axial shift of piston 18.

Pinion gear 19 co-operates with gear 20 mounted on and splined to the cam shaft b, so that the cam shaft is driven directly from the crank-shaft, but with the drive subject to the additional rotative movements described with respect to gear 19, the latter having the effect of advancing or retarding the timing of the valves c and timer d, depending upon the direction in which gear 19 is given its additional movement through the shift in position of the piston 18.

In the present invention the shift of the piston 18 is provided, in one direction, by the hydraulic mechanism presently described in detail, this movement being toward the left in Fig. 1, the movement in the opposite direction being by a spring 21, the latter being located internally of gear 19 between the inner end of portions 17 and the step a', and therefore constantly tending to shift piston 18 toward the right in Fig. 1.

The hydraulic mechanism referred to is in the form of a suitable pump 22, illustrated as located in the crank-case and driven from the crank-shaft, with the drive such that the pump itself is responsive to the crank-shaft speed, the result being that the volume of fluid pumped per unit of time is directly responsive to the crank-shaft speed. The pump is operatively connected with the interior of cylinder 13 by suitable conduit connections which include a manually-operable valve designed to control the effective area of the conduit for a definite speed value. These conditions, in Fig. 1, are as follows:

The casing walls include an annular channel 23 within the zone of bearing 15 external of the wall of cylinder 13, with the latter provided with a plurality of openings 24 which afford open communication between channel 23 and the interior of the cylinder. The casing carries a channel 25 leading to channel 23, with channel 25 extending to a channeled fitting 26 secured to the casing, the channeled formation of the fitting including a valve 27, preferably of the needle-point type and manually adjustable, the needle point extending within a port 28 the effective area of which is determined by the adjusted position of valve 27. The fitting channel is connected with the pump 22 by a suitable connection such as 29. By adjusting valve 27 to permit passage of the desired volume of fluid at idling speed, for instance, it is possible to control the volume of fluid supplied per unit of time by the rate of flow of the fluid, with the latter determined by the pumping speed set by the crank-shaft speed; since the variations in the latter will cause variations in the pump discharge volume, the rate of flow will be correspondingly varied.

It is obvious, of course, that with the piston 18 completing the chamber within cylinder 13 to which this fluid is being delivered, provision must be made for the escape of fluid from the chamber, since the pump, in operation, sets up the conditions of a continuous supply. This escape is provided in the form of an opening 30 located in the wall of cylinder 13, the opening having a configuration tending to set up a metering action, the drawings (Fig. 7) indicating this configuration as of oblong form, this being illustrative only. The active portage through the opening 30 is determined by the position of piston 18. For instance, in Fig. 7, which like the remaining figures presents the position of parts in the idling position of the engine, the piston 18 is shown as exposing a small portion of the opening, with the result that fluid within the cylinder can escape therefrom through this exposed zone of the opening, the volume escaping per unit of time being definitely related to that being supplied by the pump 22 during the same period of time, the relation being such that the position of the piston will remain constant as long as the speed of the crank-shaft remains constant. The escaping fluid passes into an annular channel within a brake-disk 31, presently described, and, through ports leading from such annular channel reaches the interior of the casing where it flows to the sump of the crank case within which the pump 22 is located.

When the engine is inactive, spring 21 will be active to shift the position of piston 18 to the right in Figs. 1 and 7, until opening 30 is completely closed, the remainder of the piston chamber and the connections being filled with the fluid. When the crank-shaft becomes active, during starting, pump 22 is made active, thus increasing the volume of fluid in the piston chamber and shifting piston 18 toward the left from such inactive position thus opening the port or opening 30, the latter permitting discharge of chamber content to a controllable amount, such as to locate the piston 18 at the desired position for the particular crank-shaft speed which may be present at the moment. As the crank-shaft speed is increased, the increase in fluid volume delivered to the piston chamber shifts the piston and increases the area of the portage to increase the outflow of fluid from the chamber, so that the effective volume within the piston chamber is always that which is required to locate the piston at the desired position needed to meet the conditions of crank-shaft speed. And since the piston position determines the particular relationship between the opposing pseudo-threaded structures of portion 17 and gear 19, it can be understood that the arrangement thus described has the effect of controlling the timing of the cams and ignition.

Consequently, as the speed of the crank shaft is increased, its effect will be presented in the position of the piston and consequently in the position of member 17, with the result that the pseudo-thread relationship between member 17 and gear 19 will cause timing advance in equal amounts with successive increments of speed increase of equal amount, due to the fact that the variations in open portage are so arranged as to set up the desired balanced status between the inflow and outflow of fluid to and from the cylinder, with changes in the inflow providing concurrent changes in the outflow designed to preserve this balanced condition. As a result the change in timing will—excepting as hereinafter indicated—not only take place in instant response to speed change, but are of substantially uniform value in presence of successive speed changes of similar and equal value, since the length of shift of the piston would be similar in amount for the successive changes.

However, the invention is not limited in this respect, since it is possible to vary the shape of the port 30 to change the conditions. For instance, should it be desired to vary the relation between timing and speed, as by varying the amount of timing advance with successive increments of increasing speed by decreasing the amount of timing advance with the successive increments, such results can be obtained by changing the shape of port 30 in the direction of a triangular formation with the wider end at the left in Fig. 1. With such form of port, it is obvious that the balanced status will be reached before the piston has advanced the equal distance, so that the portage, in such case, would provide a lessened length of shift of the piston with successive increments of speed of equal amount; and since the angular advance of gear 19 depends upon the length of shift of the piston, such form of port would serve to decrease the rate of advance of the timing as the speed increased.

This is being referred to to illustrate the possibilities present through varying the shape of port 30. In fact, the shape of the port 30 can be arranged in such manner as to produce practically any desired timing conditions needed for the most efficient operation of a particular engine. By varying the width of the port at desired points the rate of timing advance can be increased or decreased as desired, thus making it possible to meet the particular characteristics of engine cylinder operation. By varying the width of the port, the length of shift of the piston under an increase of speed can be controlled to meet any desired timing variation, since the balanced status is provided by the relation between the inflow and outflow of fluid to and from the cylinder, and the portage to produce this can be produced by varying the width of the port 30 or by increasing the length of the shift of the piston to thereby obtain the desired portage; obviously, an increase in width produces the desired portage with a less length of piston shift, while a decrease in width of the port will force an increase in length of piston shift in producing the desired portage to provide the balanced status.

In the present disclosure, port 30 is shown as of uniform width, with the result that the timing is advanced with substantial uniformity with equal increments of increased speed. This conforms more or less to the conditions set up under present-day practice. In that practice, it is assumed that the compression value increases as the throttle opens with its resultant increase in speed, and the timing advance is arranged to meet this condition, this being a necessary assumption under the control operation of centrifugal governors where speed alone serves as the controlling agency. The actual conditions which may produce variations from the assumption cannot well be taken care of by such control; with the present type of control, these actual conditions can be considered, and, by a proper shape of the port 30, the true conditions can be considered and the timing arranged to more accurately accord with the actual compression values present.

In the above, the description refers to conditions where the inflow and outflow of fluid to and from the chamber are balanced—times when the engine is operating under normal running conditions, the comparison being on the basis of running speeds. This does not take into consideration the actions present during the period of change or the conditions present when the speed is being decreased. Since a shift in the throttle provides a sudden increase in crank-shaft speed and hence a corresponding increase in pumping speed and resultant volume delivered to the cylinder per unit of time, it will be apparent that at the instant of change, the sudden addition of fluid to the piston chamber may tend to cause a slight over-running of the piston 18. But such over-running also increases the portage of port 30 to an extent sufficient to provide a slight excess of outflow, with the result that spring 21 becomes active to shift the piston 18 to its balanced position where the pressure of the fluid within the chamber equals that of spring 21, the excessive pressure of spring 21 being but momentary. And, due to the fact that the change is made in the presence of fluid, and is the result of restoring the circulation of fluid from a temporary unbalanced to a balanced status as between the inflow and outflow ports, the movements are more or less damped, so that the conditions of "hunting" are of minimum extent, with the balanced status developed with rapidity and without material overrunning effects.

The description thus far has been based on a control of the timing by speed conditions alone. Where the vehicle is operating at a constant running speed, no other control than that described would be needed, but, as previously pointed out, other conditions are present, some of which have been referred to above, viz: Acceleration and deceleration, light and heavy loads, etc. As pointed out, the effect of these with respect to compression values, etc., is varied, and can affect smooth operation of the engine by setting up the conditions of loss of power, knocking, etc. Because of these conditions the speed control referred to has been supplemented by what is being termed a load control. This control is designed more particularly to meet the conditions set up by variations from a normal operation, by temporarily combining with the speed control an additional control which is so superposed on to the speed control as to vary the responsive action of the mechanism from that which is present when the speed control alone is active. The mechanism for this "load" control will now be described:

Mounted loosely on the walls of cylinder 13 is the brake drum 31, previously referred to. This drum is operatively connected to gear 19 by means of a helical spring 32 of sufficient strength to form a drive relation between the gear and the drum. Hence, if the drum is not restrained, it will rotate as an appendage to the gear and be inactive excepting as to its function of conveying the discharged fluid in the direction of the oil sump. If, however, the drum be braked, it will provide a resistance to its free rotation and thus place spring 32 under a torsional stress which is made effective upon gear 19, and tending to retard the advance of the latter, the value of the retardation depending upon the braking value. However, such retarding effect would not become manifest upon gear 19, if the position of piston 18 remained constant, since gear 19 is being positively driven through its pseudo-threaded connection with portion 17, so that, in such condition, the brake would be attempting to operate in opposition to the crank-shaft. To meet this condition the following is employed:

As shown more particularly in Figs. 2 and 3, the hub 31a of drum 31 is provided with a notch 33 of a material angular length sufficient to permit a desired rotative movement on the cylinder such as would be provided by the braking action. A pin 34, carried by cylinder 13, extends into this notch, as indicated in Fig. 3, the pin limiting the extent of relative angular movement between the drum and cylinder. The wall of cylinder 13 carried an opening 35—shown, for illustrative purposes, as circular—this opening or port being shown as located in the path of travel of an inclined wall 33a of the notch. In the position of the parts shown, the structure is assumed to be operating at idling speed, in which case the pin 34 is in the position indicated in Fig. 3 under the action of spring 32, and with the hub overlying port 35. If, however, the drum be subjected to restraint, as by braking, its speed will be momentarily checked, while pin 34 and port 35 continue to advance, the result being that port 35 passes to an exposed position relative to wall 33a, thus opening an additional outflow port from the interior of cylinder 13. Due to the inclination of the wall 33a and the configuration of port 35, it will be understood that these two elements set up the characteristics of a metering port, since the exposed area will depend upon the value of the relative movement between drum and cylinder. When this movement is sufficient to shift pin 34 to the opposite extreme of notch 33 shown in Fig. 3, the entire area of port 35 will be exposed.

The brake for the drum is controlled from the intake manifold, and is generally similar to that presented in my companion application. 36 indicates a member or brake-carrier carrying a brake block 37 of suitable construction, member 36 being mounted in and movable longitudinally of a suitable bore of the casing and held against rotation by a pin 38. The outer end of the bore is closed by a threaded plug 39, the plug and member being separated and held apart by a spring 40 which tends to move member 36 in a direction to cause brake block 37 to engage the periphery of drum 31. The casing carries an opening 41 opposite the space between plug 39 and member 36, and this opening is in open communication with the intake manifold by a connection 42. The power value of spring 40 is arranged so as to dominate the depression value of the intake when such depression value is below a predetermined value, the threaded plug 39 permitting adjustment of the spring power value to produce the desired effect.

Hence, with the engine operating at normal running speed, at which time the depression value of the intake is of greater value than the power of spring 40, the brake will be retained out of contact with drum 31, the latter then being in the position of Fig. 3 relative to the cylinder 13, so that port 35 remains closed; this condition is not changed by increasing the depression value—as when moving the throttle in its closing direction—since the increased depression value or vacuum simply moves member 36 farther away from drum 31. If, however, the depression value in the intake manifold becomes less than the power value of spring 40, the latter forces the brake block 37 into contact with the drum periphery, thus checking advance of the latter, so that overrunning by cylinder 13 advances port 35 to an exposed position—spring 32 being tensioned—thus opening port 35 for additional escape of fluid to disturb the previous relation between inflow and outflow to and from the cylinder, with the result that the power of spring 21 dominates sufficient to shift piston 18 toward the right, a movement which changes the pseudo-threaded relation between gear 19 and portion 17 to set up a movement of gear 19 in the direction of retarding the spark.

Hence, during acceleration, the momentary change in the compression value within the engine cylinder from a lower to a higher compression value, is detected instantly, with an immediate response in the form of a retarded spark. When the depression value in the intake returns to a value above that of spring 40, brake carrier 36 is withdrawn, releasing the drum from braking action, whereupon spring 32 becomes active to return the drum to the position of Fig. 3 thus closing port 35 to enable port 30 alone to act in the control of the outflow from the cylinder.

As indicated, port 35 has the characteristics of a metered port, the advantage of which lies in the fact that the power of spring 40 will have varied values since the vacuum is operating in opposition to the power of this spring, and unless there is complete collapse of the vacuum, the effective braking power will be that provided by the differential between the vacuum and the spring power. Hence, if the acceleration is small, the lowering of the depression value in the intake will not reach collapse condition, so that the effective braking power will be lessened with a resultant smaller retardation of the drum; since, in such case the increase of crank shaft and pump speed would also be small, the excess fluid pumped will be small and can be compensated by a small exposure of port 35. Where the acceleration is to the maximum, the vacuum will approach collapse, in which case the full power of spring 40 becomes active, and by increasing the exposure area of port 35 accordingly, compensates for the increased pumping action.

During the time of activity of the braking action, the normal relation between inflow and outflow of fluid to and from cylinder 13 will be varied from the normal which would be present under speed control alone, to permit piston 18 to move to a temporary position, the movement being toward the right in Fig. 1. Such movement of the piston varies the exposed portage of port 30, so that there is no material excess movement of piston 18 in making the shift, the two metering ports accurately regulating the outflow to compensate for the change in pumping conditions due to crankshaft speed acceleration and deceleration. When the balanced status between the content of the cylinder and spring 21 is reached, the proper timing for the new speed will be present and the resultant building up of depression values in the intake manifold will release drum 31 from braking action and restore the control to speed alone.

Where the load is light, the half-open throttle status represents approximately the general upper limits of required gas supply for normal running conditions; hence the compression values are in the lower ranges with the depression values high. As a result, the brake generally remains inactive excepting during acceleration and deceleration periods. Where the load is heavy, the gas requirements are higher, with the result that the throttle operation is based on the fully open range, thus causing higher compression values with a resultant low depression value, so that the brake may become active during running conditions as well as during acceleration. With the light load, therefore, a relatively advanced spark is desirable, while under heavy-load conditions a relatively-retarded spark is preferable; the present invention provides for meeting both conditions.

The structure of Fig. 8 is, fundamentally, similar to the above, the differences being in the way the fundamentals are obtained. In this form the extension 10—indicated as 10a—is applied to the cam-shaft b instead of the crank-shaft a, thus shifting the position of the control mechanism. Since this change places the axis of the member 17 in alinement with the cam-shaft axis instead of with the crank-shaft axis, the complemental structure previously found as the hub of gear 19 is shifted to and becomes the hub of gear 20. Structurally, the control mechanism remains as before, excepting possibly in dimensions of port 30.

The change, however, has the effect of reversing the drive. Gear 19 is now driven directly by the crank-shaft, and since gear 20 is driven by gear 19, gear 20 becomes the driving element and member 17 the driven element, the latter rotating the cam-shaft through its splined connection with extension 10a. Member 17 can thus serve either as the driving element (Fig. 1) or the driven element (Fig. 8) in the drive from the crank shaft to the cam shaft, the latter, in either case, being driven at the proper speed relation to the crank-shaft and with the proper timing angularity as set by the control mechanism. In other words, the speed drive is set up between the external splines 17a of member 17 and the co-operating internal configuration of a gear hub, while the timing angularity is provided by the particular location of such internal configuration within the length of the member splines, regardless of whether member 17 is carried by extension 10 or extension 10a, the latter determining whether the member splines become the driving or the driven elements in such drive relationship; the effect on the cam shaft is similar in both cases.

The mechanism itself is simple and not likely to get out of order, since the parts are sturdy and arranged for operation in simple ways, thus avoiding complicated structures and the need for constant adjustment and attention to preserve accuracy in operation. In addition, the ability to arrange the mechanism for various types of engines through the form and dimensions of port 30, enables the system to be employed with various types of motors with a minimum requirement of change in structure and with no requirement of a change in fundamentals.

While I have disclosed several ways in which the invention may be utilized, including method and apparatus it will be readily understood that changes and modification therein may be found desirable or essential in meeting the various exigencies of use, and I therefore reserve the right to make any and all such changes or modifications therein as may be found necessary or desirable, insofar as the same may fall within the spirit and scope of the invention as expressed in the following claims when broadly construed.

Having thus described my invention, what I claim as new is:

1. In the control of timing activities of internal combustion engines, wherein the crank and cam shafts are operatively connected in drive and driven relation, and wherein the connections include a pair of co-operating axially-alined elements with one of the elements spring-supported and shiftable relative to the other in the direction of its axis and with the elements operatively connected to cause relative rotative movement therebetween by such axial shifting movement while maintaining the drive and driven relationship, the method of positioning said elements relatively to each other which consists in establishing a fluid circulation by and during engine operation with the fluid variable volumetrically responsive to crank-shaft speed, and positioning the elements relatively to each other by utilizing a variable percentage of the flowing fluid volume to variably position the shiftable element axially and to determine and maintain the element positions during running speeds of the engine, the active volume percentage being responsive to crank-shaft speed.

2. A timing control method as in claim 1 characterized in that the element positions are additionally varied by varying the active volume percentage in response to changes of predetermined range in the depression values of the intake manifold of the engine to determine element positions during transition from one speed to another speed.

3. As a means for controlling the timing activities of internal combustion engines, wherein the crank and cam shafts are operatively connected in drive and driven relation, and wherein the timing activities are adjustably responsive to crank-shaft speeds with the cam shaft operative in timed relation to the crank shaft, the combination with the crank and cam shafts and drive connections therebetween, and timing mechanism rendered active by cam shaft operation, of means active within said connections and responsive to crank-shaft speed for adjustable angular regulation of the cam shaft while maintaining drive relationship to thereby control the timing activities, said means including mechanism for establishing a fluid circulation by and during engine operation with the volume of fluid circulated responsive to crank-shaft speed, said mechanism including means rendered active by a volumetric percentage of the flowing fluid for regulating the angular relation of the cam-shaft to the crank-shaft.

4. An assembly as in claim 3 characterized in that the mechanism includes a pumping instrumentality directly responsive to crank-shaft speed and operative as the power source for the circulating fluid.

5. An assembly as in claim 3 characterized in that the mechanism includes a pumping instrumentality directly responsive to crank-shaft speed and operative as the power source for the circulating fluid, and a chamber into which the pumped fluid is delivered, said chamber having controllable waste portage for determining the effective volume of fluid within the chamber.

6. An assembly as in claim 3 characterized in that the mechanism includes a pumping instrumentality directly responsive to crank-shaft speed and operative as the power source for the circulating fluid, and a chamber into which the pumped fluid is delivered, said chamber having controllable waste portage for determining the effective volume of fluid within the chamber, the connections between the instrumentality and the chamber including manually-controlled means for determining the rate of fluid flow through the connections with the rate determined by a desired relationship between crank-shaft speed and the timing angularity of the cam shaft for a unit speed of the crank-shaft.

7. An assembly as in claim 3 characterized in that the mechanism includes an expansible chamber into which the circulating fluid is delivered with the chamber having controllable waste portage effective to provide a definite relationship between the chamber dimensions and the speed of the crank-shaft.

8. An assembly as in claim 3 characterized in that the mechanism includes a cylinder and piston structure for forming an expansible chamber into which the circulating fluid is delivered, said cylinder having controllable waste portage effective to provide a definite relationship between the chamber dimensions and the crank-shaft speed by controlling the position of the piston within the chamber.

9. An assembly as in claim 3 characterized in that the mechanism includes a cylinder and piston structure for forming an expansible chamber into which the circulating fluid is delivered, said cylinder having controllable waste portage effective to provide a definite relationship between the chamber dimensions and the crank-shaft speed by controlling the position of the piston within the chamber, the piston being spring supported in opposition to the fluid pressure.

10. An assembly as in claim 3 characterized in that the mechanism includes a cylinder and spring-supported piston forming an expansible chamber into which the fluid is delivered with the chamber having controllable waste portage effective to provide a percentage of the fluid active to position the piston within the chamber, said piston carrying an element operative in the drive connections between the shafts with the element movable with the piston, the position of said element determining the angular relationship in the drive relation between said shafts.

11. An assembly as in claim 3 characterized in that the mechanism includes a cylinder and spring-supported piston forming an expansible chamber into which the fluid is delivered with the chamber having controllable waste portage effective to provide a percentage of the fluid active to position the piston within the chamber, said piston carrying an element co-operative with a gear of the drive connections between the shafts with the element movable with the piston, the position of the element determining the angular relationship in the drive relation between said shafts.

12. An assembly as in claim 3 characterized in that the mechanism includes a cylinder and spring-supported piston forming an expansible chamber into which the fluid is delivered with the chamber having controllable waste portage effective to provide a percentage of the fluid active to position the piston within the chamber, said piston carrying an element co-operative with a gear of the drive connections between the shafts with the element movable with the piston, the position of the element determining the angular relationship in the drive relation between said shafts, the element and gear co-operating through a pseudo-thread connection to thereby translate piston movements into angular adjustment of the gear.

13. As a means for controlling the timing activities of internal combustion engines, wherein the crank and cam shafts are operatively connected in drive and driven relation, and wherein the timing activities are adjustably responsive to crank-shaft speeds with the cam-shaft operative in timed relation to the crank shaft, the combination with the crank and cam shafts and drive connections therebetween, and timing mechanism rendered active by cam shaft operation, of means active within said connections and responsive to crank-shaft speed for adjustable angular regulation of the cam shaft while maintaining drive relationship to thereby control the timing activities, said means including mechanism for establishing a fluid circulation by and during engine operation with the volume of fluid circulated responsive to crank-shaft speed, said mechanism including means rendered active by a volumetric percentage of the flowing fluid for regulating the angular relation of the cam-shaft to the crank-shaft, the active volume of the volumetric percentage being determined by controllable waste portage rendered active by engine operation, said portage being variable as to value responsive to and during such engine operation.

14. An assembly as in claim 13 characterized in that the value of the waste portage is directly responsive to crank-shaft speed during normal running-speed operation of the engine.

15. An assembly as in claim 13 characterized in that the value of the waste portage is directly responsive to crank-shaft speed during normal running-speed operation of the engine, the value of the waste portage increase being responsive to predetermined depression-value conditions within the intake manifold of the engine.

16. An assembly as in claim 13 characterized in that the value of the waste portage is directly responsive to crank-shaft speed during normal running-speed operation of the engine, the value of the waste portage increase being responsive to predetermined depression-value conditions within the intake manifold of the engine, the additional means being operatively connected to the intake manifold of the engine and subject to the depression-value conditions of such manifold, such additional means being inactive during normal running-speed conditions and rendered active in response to depression-value conditions within a zonal portion of the variation range of such values leading from the zero and of such range in the direction of but remote from the maximum value end of such range.

17. An assembly as in claim 13 characterized in that the value of the waste portage is directly responsive to crank-shaft speed during normal running-speed operation of the engine, the value of the waste portage increase being responsive to predetermined depression-value conditions within the intake manifold of the engine, the additional means being operatively connected to the intake manifold of the engine and subject to the depression-value conditions of such manifold, such additional means being inactive during normal running-speed conditions and rendered active in response to depression-value conditions within a zonal portion of the variation range of such values leading from the zero end of such range in the direction of but remote from the maximum value end of such range, with the maximum variation of volumetric percentage from the normal provided when the depression-value conditions are zero.

18. As a means for controlling the timing activities of internal combustion engines, wherein the crank and cam shafts are operatively connected in drive and driven relation, and wherein the timing activities are adjustably responsive to crank-shaft speeds with the cam-shaft operative in timed relation to the crank shaft, the combination with the crank and cam shafts and drive connections therebetween, and timing mechanism rendered active by cam shaft operation, of means active within said connections and responsive to crank-shaft speed for adjustable angular regulation of the cam shaft while maintaining drive relationship to thereby control the timing activities, said means including mechanism for establishing a fluid circulation by and during engine operation with the volume of fluid circulated responsive to crank-shaft speed, said mechanism including means rendered active by a volumetric percentage of the flowing fluid for regulating the angular relation of the cam-shaft to the crank-shaft, the active volume of the volumetric percentage being determined by controllable waste portage rendered active by engine operation, said portage being variable as to value responsive to and during such engine operation, the value of the waste portage being automatically controlled by the speed and load characteristics presented during engine operation.

19. An assembly as in claim 18 characterized in that the fluid circulation path includes an expansible chamber with which the waste portage is operative, said waste portage being provided by a pair of outlets one of which is controllably responsive to the speed of the crank-shaft, the other outlet being inactive during normal engine operation and rendered active by depression-value conditions within the intake manifold of the engine within a predetermined range of such depression values.

20. An assembly as in claim 18 characterized in that the fluid circulation path includes an expansible chamber with which the waste portage is operative, said waste portage being provided by a pair of outlets one of which is controllably responsive to the speed of the crank-shaft, the other outlet being inactive during normal engine operation and rendered active by depression-value conditions within the intake manifold of the engine within a predetermined range of such depression values, means being provided for controlling the time of activity and volume value of the latter outlet with the means subject to the depression value conditions of the manifold and operative to maintain the outlet closed when the depression values are without such predetermined range.

21. As a means for controlling the timing activities of internal combustion engines, wherein the crank and cam shafts are operatively connected in drive and driven relation, and wherein the timing activities are adjustably responsive to crank-shaft speeds with the cam-shaft operative in timed relation to the crank shaft, the combination with the crank and cam shafts and drive connections therebetween, and timing mechanism rendered active by cam shaft operation, of means active within said connections and responsive to crank-shaft speed for adjustable angular regulation of the cam shaft while maintaining drive relationship to thereby control the timing activities, said means including mechanism for establishing a fluid circulation by and during engine operation with the volume of fluid circulated responsive to crank-shaft speed, said mechanism including means rendered active by a volumetric percentage of the flowing fluid for regulating the angular relation of the cam-shaft to the crank-shaft, the active volume of the volumetric percentage being determined by controllable waste portage rendered active by engine operation, said portage being variable as to value responsive to and during such engine operation, the circulation path including an expansible chamber having a pair of controllable outlets active as the waste portage, the control of one of the outlets being responsive to crank shaft speed, and means responsive to depression values of the intake manifold for controlling the other of said outlets as to time of activity of the outlet and the volume value of the waste through said outlet.

22. An assembly as in claim 21 characterized in that the latter means includes a closure for said outlet normally retaining the outlet closed and shiftable relative to the outlet to open the latter controllably in presence of a predetermined range of the depression value conditions within the intake manifold.

23. An assembly as in claim 21 characterized in that the latter means includes a closure for said outlet positioned to close the outlet during normal engine running, said closure being shiftable to open the outlet in presence of a predetermined range of depression values within the intake manifold and to automatically return to the closing position when the depression value conditions in the manifold are without such range.

24. An assembly as in claim 21 characterized in that the latter means includes a closure for said outlet positioned to close the outlet during normal engine running, said closure being shiftable to open the outlet in presence of a predetermined range of depression values within the intake manifold and to automatically return to the closing position when the depression value conditions in the manifold are without such range, the degree of outlet opening being variable and determined by the variations in depression values within such range to thereby automatically control the volume value of the outlet when active.

HERBERT L. DUNCAN.